3 Sheets--Sheet 3.

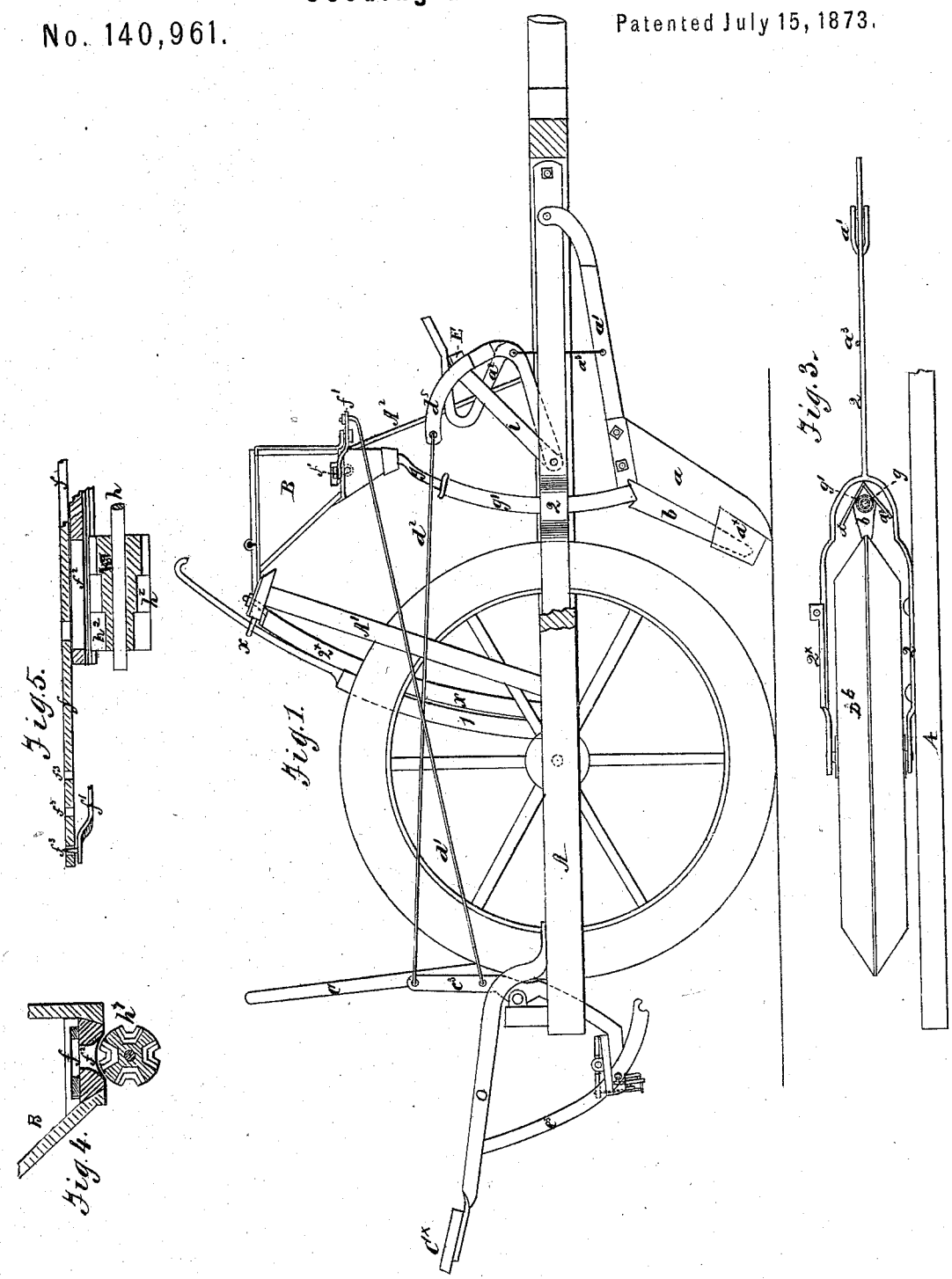
H. F. STINDE.
Seeding-Machines.
No. 140,961.
3 Sheets--Sheet 1.
Patented July 15, 1873.
Witnesses:
Edw. F. Brown
B. F. James
Inventor:
Herman F. Stinde

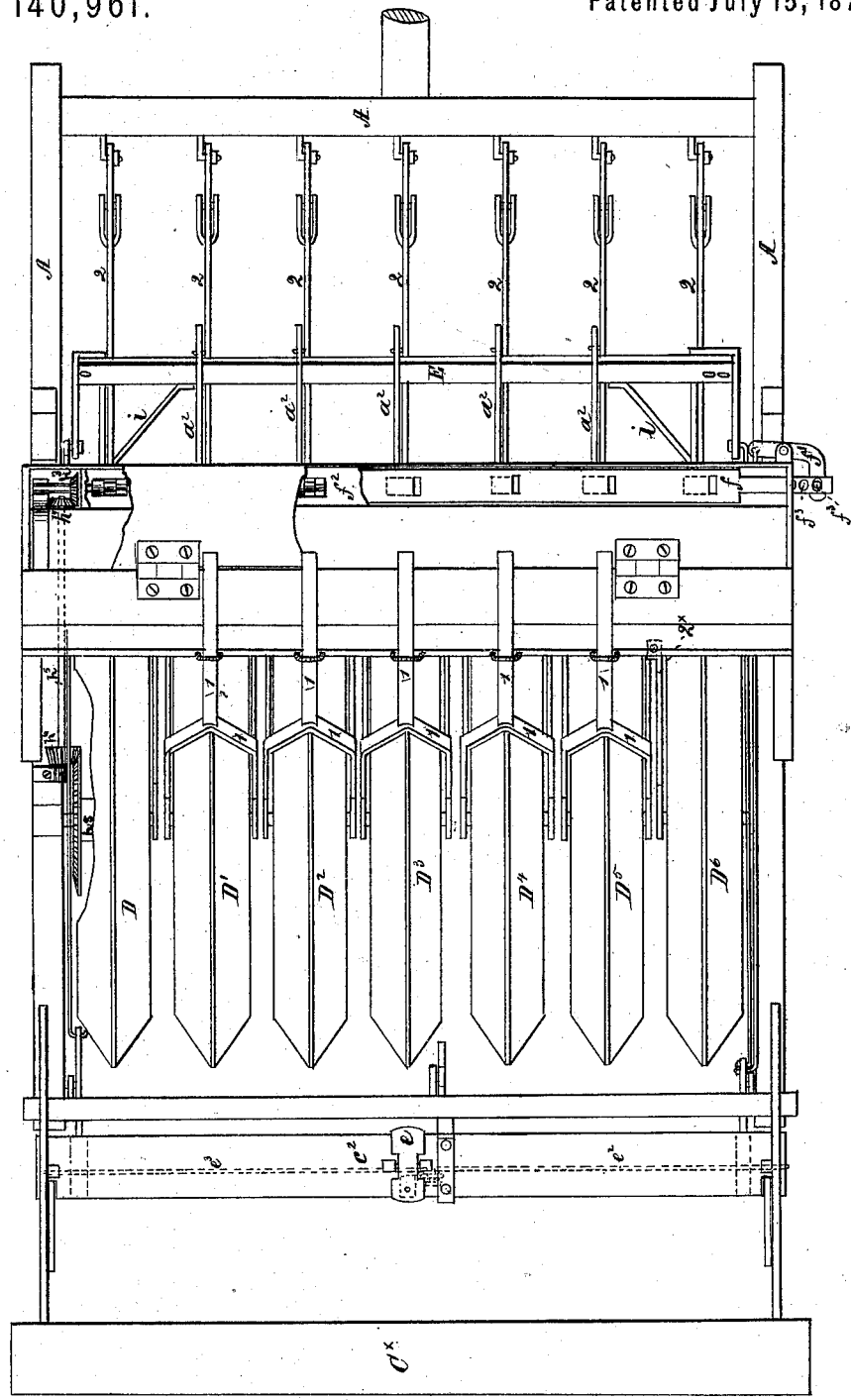

H. F. STINDE.
Seeding-Machines.

No. 140,961. Patented July 15, 1873.

Witnesses,
Edw. F. Brown.
B. F. James.

Inventor,
Herman F. Stinde

AM. PHOTO-LITHOGRAPHIC CO. N.Y. (OSBORNE'S PROCESS.)

UNITED STATES PATENT OFFICE.

HERMAN F. STINDE, OF ST. LOUIS, MISSOURI.

IMPROVEMENT IN SEEDING-MACHINES.

Specification forming part of Letters Patent No. 140,961, dated July 15, 1873; application filed May 6, 1873.

*To all whom it may concern:*

Be it known that I, HERMAN F. STINDE, of the city and county of St. Louis, State of Missouri, have made and invented a new and Improved Seeding-Machine or Grain-Drill; and I do hereby declare the following to be a true and correct description of the construction and operation of the same, reference being had to the accompanying drawings making part and parcel of this my specification.

The nature of my invention consists substantially in the construction and arrangement of a seeding-machine or grain-drill in such a manner that the supply of seed to be delivered to the ground may be governed and regulated by means of a rod running horizontally at the bottom of the feeding-box, containing upon it hubs or cylinders, within which spaces or recesses are formed to receive the grain as it passes through the slide or valve, and the bottom of the feed-box containing openings for that purpose; and in the mode of operating such rod; also, in the peculiar form and construction of the drill-teeth or colter; also, in the mode of connection to such teeth or colter of a seed-supply tube; also, in the means and method employed to raise from the ground, at one and the same operation, all of such teeth or colters, by means of a combination of cams, rods, and levers; also, in the mode of construction and arrangement of a harness to each of the wheels employed to cover the grain when deposited in the ground, and the method employed in the attachment of such harness to the frame of the machine; also, in the arrangement of wheels loosely upon separate axles attached to a harness that admits of a vertical movement when such wheels are moving over uneven or rough surfaces, or come in contact with obstacles; also, in the form of the seed-delivery tubes or pipes, and their relation to each other; also, in mechanism to secure the drill-teeth or colters in position when raised from the ground to admit of the machine being turned, or for any other desirable purpose, without injury to the teeth or colters.

The drawings are contained on three sheets, representing different views of the machine and of some of the parts enlarged and in detail.

Figure 6:
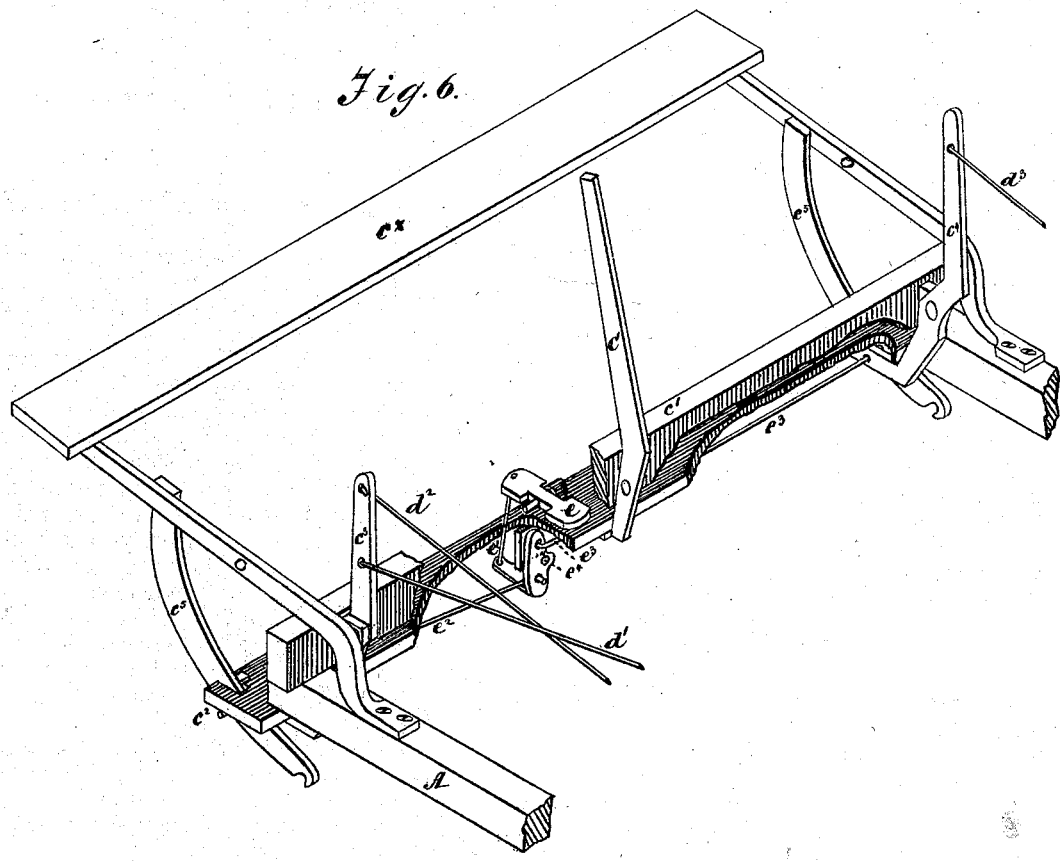
Figure 7:
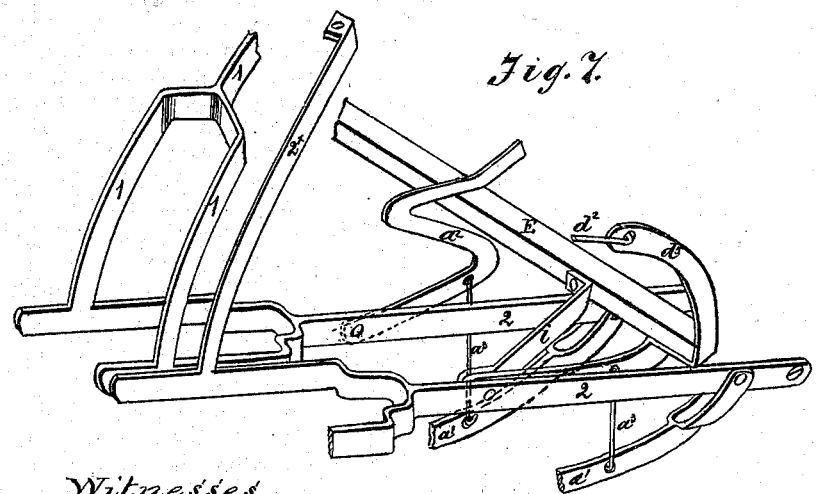

Figure 1 is a side view of the machine. Fig. 2 is a top view of the same. Fig. 3 is a top view of one of the outside wheels $D^6$, showing its mode of attachment to the frame A and harness 2. Fig. 4 is an end view, showing the feeding-box, the valve or slide, the bottom, and the feed-rod. Fig. 5 is a longitudinal section, showing the relative positions to each other of the slide or valve, the bottom, and feeding-rod, with the cylinders or hubs formed upon the latter, and connection of valve with crank-lever $f^1$. Fig. 6 is a perspective view of the rear portion of the machine, showing in part the devices used to raise and lower the drill-teeth or colters. Fig. 7 is a plan view, showing the relation of the harnesses to each other, and the form of hooks used to support the colter-bars, and the bar upon which such hooks rest.

In order to enable others skilled in the art to make and use my invention, I will proceed to describe the same. Letters and figures in the several drawings represent the same parts or portions of the machine.

A represents the main portion of the frame-work of the machine, to which all other portions of the same are directly or indirectly attached. $A^1$ is a post or frame-work attached to the main frame A on both sides, inclining in a forward direction, its upper cross-piece connecting the two posts, forming the rear support to the feeding-box B, the latter being constructed in the usual manner to hold the seed. This frame-work supports and guides the harness 1 attached to the wheels $D^1$, $D^2$, $D^3$, $D^4$, and $D^5$, by means of the loops or staples $x\ x\ x$, that are fastened to cross-pieces of the posts $A^1$, and through which the arm or prolongation of the harness 1 passes, the upper end of said arms being bent forward at right angles to prevent them from slipping out of the loops or staples $x\ x\ x$. The forward end of the feed-box B is supported by a metal bar or brace, $A^2$, which inclines backward at or about the same angle with the frame A as does the post or frame $A^1$. In my machine I use seven wheels; a greater or less number may be used and employed for the purposes designed, involving the same principles. These wheels are designated as D D$^1$ D$^2$ D$^3$ D$^4$ D$^5$ D$^6$, the peripheries of which in cross-section are of the form substantially of the letter V inverted—thus, ∧—for the purposes hereinafter designated. These wheels are confined to and within the frame-work of the machine by means of a double set of harness, 1 and 2. The harness No. 2 governs the forward motion or movement of the wheels, is of a forked shape where it embraces the wheel, and beyond the periphery of the wheel is united, and an arm or prolongation of the harness is thus made or formed, and is attached to the forward end or frame-work A, as seen in Fig. 2. A bolt passing through the fork of the harness and the hub of the wheels forms an axle for the latter. The two outside wheels D and D$^6$ are secured by means of their harness to the frame A, as seen in Fig. 3, and form the supporting-wheels of the machine. The harness No. 1 is constructed in a similar manner to that above described; but its movements are in a vertical arc, or nearly so, and is attached to harness 2 by rivets, soldering, or in any suitable manner, at a point a little forward of the axle of the wheel, and the arm or prolongation of the same passes through the staples, as hereinbefore described, and the same is used only in connection with the inner wheels D$^1$ to D$^5$.

It will thus be seen that the inner wheels referred to are hung loosely within the frame of the machine, and have a vertical movement, and yielding to inequalities of the surface of the ground over which they pass. The wheels referred to follow immediately after the colter in the drill made by it, and after the seed is deposited and covered by the earth falling back upon the same, and presses the latter in the ground. The wheels D and D$^6$ are further supported and sustained by means of the bar or rod 2$^\times$ fastened to the inner side of the harness 2 just forward of the axle, the upper end of which is attached to the frame-work A$^1$.

The drill-teeth or colters $a$ are composed of a sharp cutting-edge, having formed upon its rear and lower end two wings or flukes, $a^\times$, diverging each way from the colter-blade, forming an acute angle, and adjusted a short distance above the point of the colter, as seen in Fig. 1. The teeth or colters, at their upper ends, are attached to an arm that projects forward, and is pivoted to the arms of the harness 2, as seen in said Fig. 1, and said teeth or colters slant downward and backward, as shown. A tube, $b$, having flanges formed upon it, is connected with the arm $a^1$, to which the colter is also attached, is placed in the rear of said colter, the lower point of the tube resting within and between the flukes $a^\times$, and through which the seed or grain passes to the ground. The metallic seed tubes or pipes $g'$ are connected with the colter and arm $a^1$ by means of flanges formed upon the lower ends of the same, their lower ends being within the tubes $b$, as seen in Fig. 1. The pipes $g$ are constructed of metal, upon the upper end of which is formed a hopper, that is attached to the feed-box B, and receiving the seed therefrom. These pipes are also of circular form, the radius of the arc being the distance from the point where the arm $a^1$ is attached to the harness 2 and the point of intersection of the tube $g'$ with the tube $b$.

The pipes $g$ play freely within the tubes $g'$, the latter, by their peculiar arrangement and construction, and their relation to the colter $a$ and bar $a'$, moving freely over the uneven surface of the ground as the machine is drawn forward. Thus the seed from the box B passes through the pipes $g$, $g'$, and $b$, and is delivered into the furrow made by the colter $a$ with its flukes or wings $a^\times$.

It is necessary to regulate and control the supply of seed or grain to the tubes. The devices used consist of the feeding-box B, containing within it an adjustable bottom, with openings $f^2$ formed in the same, the under side of which is hollowed out, so that the hubs or cylinders $h^7$ formed upon the feeding-rod $h$ may revolve in close contact with such openings $f^2$, as seen in Fig. 4, into which cylinders the seed passes and is distributed into the pipes. The valve or slide $f$ is placed above the bottom containing the openings $f^2$. In this slide openings are also formed, that may be adjusted in such a manner so that seed passing through the same shall be made to fall upon and within either of the spaces formed upon the hub or cylinder of the feeding-rod $h$, and passing therefrom to the tube $g$.

The motion of the machine when in operation will cause the seed to fall through the orifices or spaces through which it is designed to pass.

To operate the slide or valve $f$ a rod, $d^1$, is connected with the bars $c^3$ and to the crank-lever $f^1$. To the opposite end of said lever the slide or valve is attached by a pivot or pin; and to regulate the throw of the slide or valve holes are made in it, so that its connection with the crank-lever can be adjusted by means of the same to a longer or shorter throw of the slide or valve to determine the quantity of grain to be delivered upon the feeding-rod. The cylinders or hubs $h^7$ formed upon the feeding rod $h$ have formed upon their sides openings or spaces of varying size, $h^2$, to receive the grain and deliver it into the feed-pipes $g$. Upon one end of the feeding-rod $h$ is adjusted a gear-wheel, $h^3$, engaging with gear-wheel $h^4$ upon the upper end of rod $h^5$; and on the lower end of said rod gear-wheel $h^6$ is adjusted, and is driven by the gearing $h^8$ of the driving-wheel D, as seen in Fig. 2. The feeding-rod $h$ is placed and secured below the feed-box B in a suitable manner, and the hubs or cylinders revolve partly within the open spaces formed in the feed-bottom $f^2$.

The means employed to raise the teeth or colters, when desired, as when the machine is to be turned round or drawn from the field, consists of a series of levers, hooks, and rods, as follows: A frame-work extends from the rear end of the machine, as seen at $o$, Figs. 1 and 6, upon the end of which rests the driver's seat $c^1$. To each end of this frame are attached the curved bars $e^5$ $e^5$, that fit into slots cut in the foot-board $c^2$, on the lower ends of which bars hooks are formed that prevent them from disengaging from the foot-board, which has free play. Upon said bars C is a lever, adjusted centrally upon the foot-board, the long arm of which is within reach and under the control of the person upon the seat. $c^3$ and $c^4$ are other levers, that approximate to a curved or bent form, the lower portions of which form supports, upon which the foot-board $c^2$ rests, as seen in Fig. 6. The foot-board is retained in the position shown in said figure by means of rods $e^2$ $e^3$ underneath said foot-board, the ends of which may enter holes made in the bars $e^5$ $e^5$. These rods are connected at their ends with the lever $e^4$, the motion of which is controlled by means of the treadle $e$. By pressing on the toe of the treadle the rods are withdrawn from the bars $e^5$, and by pressing upon the heel of the treadle the rods are forced into holes upon the bars $e^5$ under the foot-board $c^2$. To the lever-bar $c^3$ are attached the rods $d^1$ $d^2$, the former at its opposite end connecting with the crank-lever $f^1$, and the rod $d^2$ to the curved bar $d^5$, the lower end of the latter being pivoted to the arm of the harness 2, seen in Fig. 1. The rod $d^3$ upon the lever $c^4$ corresponds to the rod $d^2$, and connects with a curved bar corresponding to that of $d^5$ upon the opposite side of the machine.

The curved bars above referred to support and are fastened to the cross-bar E, as seen in Fig. 7.

$i$ are braces upon each side of the machine, pivoted to the harness 2 and bolted to the cross-bar E to hold it more firmly. Hooks $a^2$, of an S or Z shape, in number corresponding to the number of movable wheels used, are pivoted to the arms of the harness 2 at their lower point, the upper part above the elbows having two curves, which rest upon and play over the bar E. The lower of these curves will allow of the wheel to be raised without changing the position of the colter or tooth, and the upper curve serves to hold the colter-bar, in a raised position, close up to and under the harness 2. When the movable wheels fall below the fixed wheels D and $D^6$, the colters of the fixed wheels D and $D^6$ are raised by connection with the curved bar $d^5$ by means of chains or rods $a^3$. The other hooks $a^2$ are connected by chains or rods $a^3$ to each of the teeth or colter-bars $a^1$, corresponding in number to the movable wheels before referred to. By releasing the rods $e^2$ $e^3$ from the bars $e^5$ the driver draws toward him the lever C, and by means of the connecting-rods $d^1$ $d^2$ $d^3$ attached to the levers $c^3$ $c^4$ and the curved bar $d^5$ the cross-bar E is raised upward, carrying with it the hooks $a^2$, thus raising the teeth or colters from the ground. The bars $d^5$ attached to the bar E have shoulders formed upon them that rest on the harness 2 attached to the bearing-wheels D and $D^6$. By this means the colters $a^1$ that are connected by means of the chains $a^3$ and hooks $a^2$, the latter resting upon said bar E, are prevented from entering too deeply into the ground. At this same operation the rod $d^1$ operates the crank-lever $f^1$, in which the slide or valve $f$ is attached, and shuts off the supply of seed to the feed-roller $h$ until the lever C is again pushed forward and the colters or teeth again drop upon the ground.

The holes $f^3$ upon the slide or valve indicate the manner of its attachment to the crank-lever $f^1$, the throw of the valve being lengthened or shortened by making such connection by means of the different holes, as seen in Figs. 5 and 2.

$o$ $o$ represent a frame-work, attached to the frame A of the machine, to which is attached the seat $c^\times$ and curved bars $e^5$ $e^5$. The main frame A may, however, be extended backward for the same purpose and to accomplish the same results.

What I claim as my invention, and desire to secure by Letters Patent, is—

1. The combination of the frame or harness 1 and 2 with the wheels $D^1$ $D^2$ $D^3$ $D^4$ $D^5$ and loops or staples $x$ fastened to the cross-piece connecting the posts $A^1$, in the manner and for the purpose herein set forth.

2. The combination of the supporting-wheels of the machine D and $D^6$ with the frame A, at the front and side of the same, and the vertical arm $2^\times$ and cross-piece connecting the posts $A^1$, in the manner and for the purpose herein set forth.

3. The combination of the metallic circular feed-pipe $g'$ with the arm $a^1$, colter or tooth $a$ with its wings $a^\times$, and tube $b$, in the manner and for the purpose herein described.

4. The circular metallic feed-pipe $g$, combining with and fitting into the feed-pipe $g'$, both formed upon the same arc of a circle, and allowing a free and easy vertical movement of the pipe $g'$ upon the pipe $g$, when constructed and arranged in the manner and for the purpose herein described.

5. The combination of the hooks $a^2$ with the frame or harness 2, colter-arm $a^1$, rod or chain $a^3$, and bar E, in the manner and for the purpose herein described.

6. The combination and arrangement of the levers C $c^3$ $c^4$ with the foot-piece $c^2$, the connecting-rods $d^2$ $d^3$ with the curved bars $d^5$, and bar E, in the manner and for the purpose herein described.

7. The combination and arrangement of the levers C $c^3$ with rod $d^1$, crank-lever $f^1$, and feed-slide $f$, in the manner and for the purpose herein described.

8. The feeding-rod $h$ having formed upon it a series of cylinders or hubs, $h^7$, in each of which open spaces $h^2$ are formed of varying size, to regulate and control the supply of seed received within such spaces to be delivered to the seed-pipes $g$ $g$, in the manner herein set forth.

9. The combination, with the feed-rod $h$, constructed as above set forth, of the bottom $f^2$ and the feed slide or valve $f$ and feed-box B, in the manner and for the purpose herein set forth.

10. The within-described method and arrangement by which the foot-piece $c^2$ is sustained and released by means of the curved bars $e^5$, treadle $e$, lever $e^4$, and its connecting-rods $e^1$, $e^2$, and $e^3$.

HERMAN F. STINDE.

Witnesses:
EDM. F. BROWN,
B. F. JAMES.